(12) United States Patent  
Camarota et al.

(10) Patent No.: US 7,748,678 B2  
(45) Date of Patent: Jul. 6, 2010

(54) BEVERAGE CONTAINER HOLDER

(75) Inventors: Richard Camarota, Holland, MI (US); Richard Hartmann, Jr., Holland, MI (US)

(73) Assignee: ITC, Inc., Holland, MI (US)

(*) Notice: Subject to any disclaimer, the term of this patent is extended or adjusted under 35 U.S.C. 154(b) by 364 days.

(21) Appl. No.: 11/965,656

(22) Filed: Dec. 27, 2007

(65) Prior Publication Data

US 2008/0186697 A1      Aug. 7, 2008

Related U.S. Application Data

(60) Provisional application No. 60/877,783, filed on Dec. 29, 2006, provisional application No. 60/978,676, filed on Oct. 9, 2007.

(51) Int. Cl.
*A47K 5/00* (2006.01)
(52) U.S. Cl. .................................. 248/311.2; 224/926
(58) Field of Classification Search ............. 248/311.2, 248/313, 315, 309.1; 224/926, 281, 282
See application file for complete search history.

(56) References Cited

U.S. PATENT DOCUMENTS

| 5,052,649 | A | | 10/1991 | Hunnicut |
| 5,186,350 | A | | 2/1993 | McBride |
| 5,423,508 | A | | 6/1995 | Isenga et al. |
| 5,839,711 | A | * | 11/1998 | Bieck et al. .................. 248/313 |
| 5,897,041 | A | * | 4/1999 | Ney et al. .................... 224/483 |
| 5,915,832 | A | | 6/1999 | Baird, Sr. |
| 6,099,062 | A | * | 8/2000 | Siegel ..................... 296/37.12 |
| 6,315,153 | B1 | * | 11/2001 | Osborn ....................... 220/737 |
| 6,889,948 | B2 | * | 5/2005 | Melancon et al. ........ 248/309.1 |
| 2008/0011925 | A1 | | 1/2008 | Ruff et al. |
| 2008/0087786 | A1 | * | 4/2008 | Oas .......................... 248/311.2 |

OTHER PUBLICATIONS

U.S. Appl. No. 29/292,351, Richard J. Camarota et al.

* cited by examiner

*Primary Examiner*—Ramon O Ramirez
(74) *Attorney, Agent, or Firm*—Miller Canfield Paddock and Stone, P.L.C.; Timothy J. Engling

(57) ABSTRACT

A beverage container is provided for mounting to vehicles such as power boats, sailboats and recreational vehicles. The beverage container holder is adapted for mounting to support platforms on the vehicle which may be any suitable vehicle structure such as the armrest of a chair. The beverage container holder comprises a mounting ring which is first rigidly affixed to the support platform, and further comprises a cylindrical can having an upper circumferential rim which fits over the mounting ring and includes detents that positively lock the rim onto the mounting ring.

33 Claims, 13 Drawing Sheets

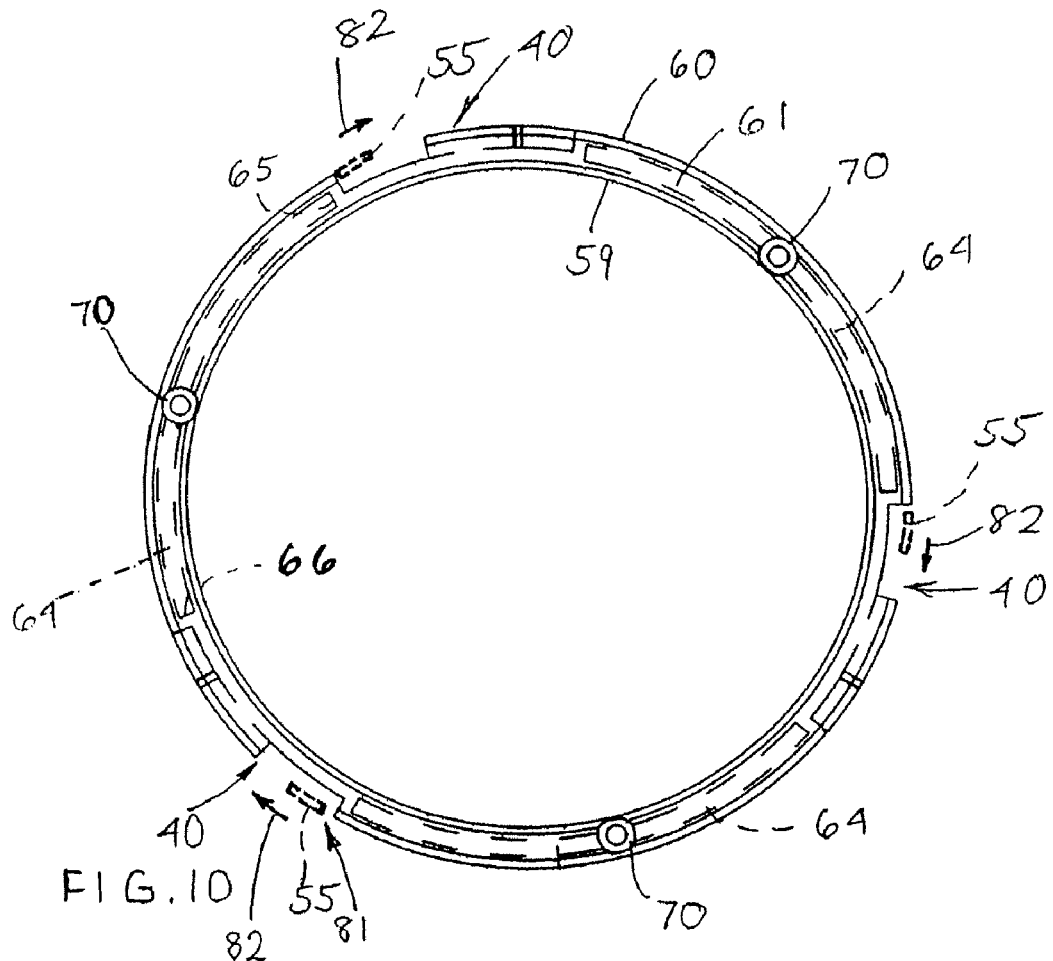

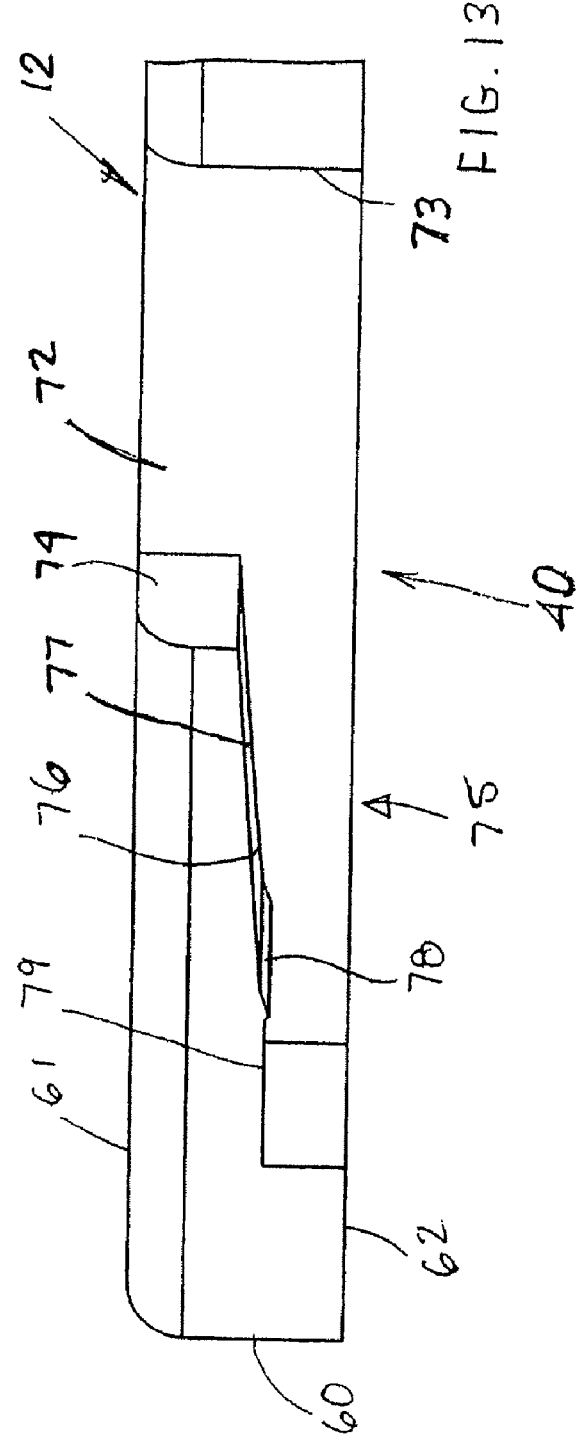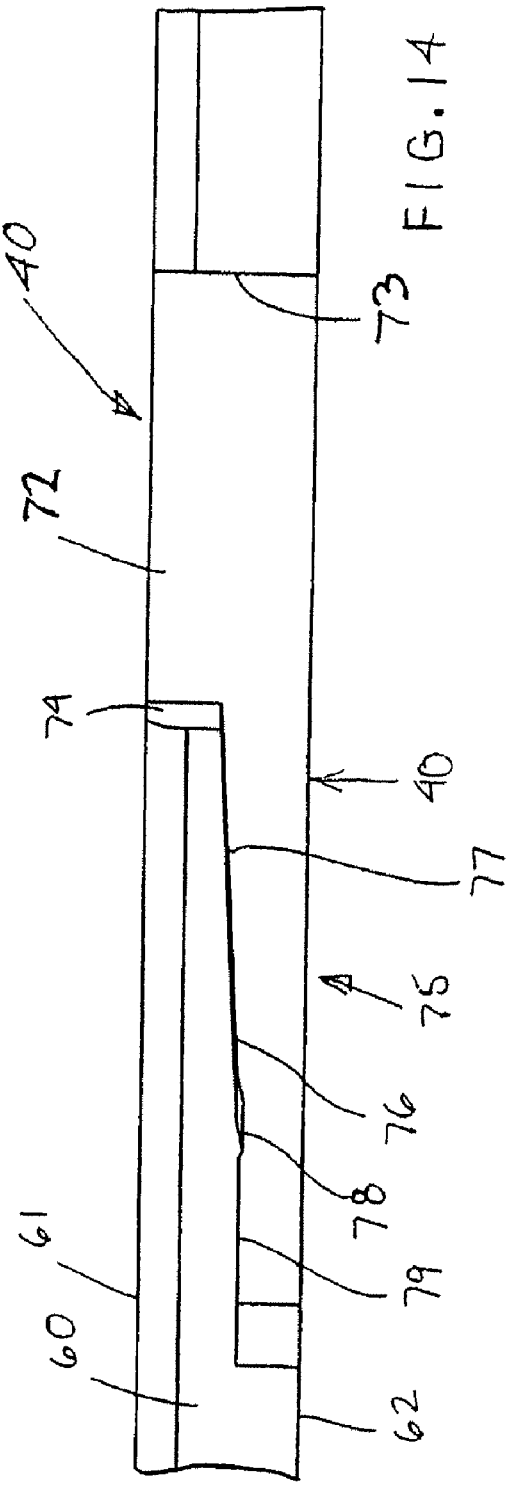

PERSP BOTTOM

BEVERAGE CONTAINER HOLDER

This Application claims priority under 35 U.S.C. 119(e) to provisional applications U.S. Ser. No. 60/877,783 filed Dec. 29, 2006 and U.S. Ser. No. 60/978,676 filed on Oct. 9, 2007 both of which are incorporated by reference herein.

FIELD OF THE INVENTION

The invention relates to a beverage container holder for vehicles and more particularly, to a beverage holder which removably mounts to a support platform.

BACKGROUND OF THE INVENTION

Cupholders in various types of boats such as power boats and vehicles such as recreational vehicles are known. Often, the boat or vehicle is not provided with the optimum number or location for the cupholders and it is desirable to retrofit the vehicle or boat with a cupholder. Cupholders may be adapted for mounting to existing vehicle platforms which may include any type of structural mounting locations on a vehicle. Such structural mounting locations may include but are not limited to the armrests of seats which may serve as a mounting platform for such drink holders.

SUMMARY OF THE INVENTION

The invention relates to an improved beverage container holder which is readily mountable to the support platform on a boat, vehicle, or the like. The beverage container holder comprises a cylindrical can which is adapted to fit various size beverage containers wherein the can incorporates an improved mounting configuration for mounting the can. The beverage container holder further comprises a mounting ring which is separately mountable to the support platform. Preferably, the mounting ring is an annular shape that surrounds a corresponding opening formed in the support platform and in which the can is to be received. Both the cylindrical can and the mounting ring can be made from plastic resin that fluoresces in the dark or is adapted for illumination for increased visibility in low light settings.

As to the improved mounting arrangement, the mounting ring includes at least one cam track formed on an exterior surface of the mounting ring and which is adapted to receive a detent provided in the can. The detent projects into the cam track when the can and mounting ring are aligned with each other and the can is seated on the mounting ring. Thereafter, the can is rotated to slide the detent along the cam track and then into a locking engagement on the cam track thus positively restraining the can in a locked condition so the can is rigidly affixed to the support platform.

The mounting ring includes separate fasteners that affix the mounting ring in a non-rotatable fixed condition on the support platform. These fasteners may include screws which are inserted downwardly through fastener bores in the mounting ring and threadedly engage the support platform. The mounting ring fasteners can also include flexible ridged projections that can be inserted downwardly into the support platform that affix the mounting ring in fixed condition on the support platform. Thus, the overall beverage container holder is positively fastened to the support platform by conventional fasteners. The rim of the can then overlies these fasteners and encloses same to provide an improved aesthetic appearance to the overall beverage container.

This provides an improved mounting structure by which the can may be readily mounted to the support platform, and also provides an improved aesthetic appearance to the container holder since the fasteners used to secure the mounting ring to the support platform are in turn covered by the rim of the can. To increase the visibility in dark conditions, the cylindrical can, the rim of the can, or the mounting ring can be made to emit light by manufacturing these components with materials that glow in the dark, fluorescent materials, or clear materials that capture and transmit light from generating sources.

Other objects and purposes of the invention, and variations thereof, will be apparent upon reading the following specification and inspecting the accompanying drawings.

BRIEF DESCRIPTION OF DRAWINGS

FIG. 10 is a plan view of the mounting ring with circumferentially spaced detents.

FIG. 11 is a side view of the mounting ring from a first orientation.

FIG. 12 is a front elevational view of the mounting ring from a second orientation.

FIG. 13 is an enlarged view of a locking track which cooperates with a respective detent.

FIG. 14 is a front elevational view of the locking track from a second orientation.

Figure 1:
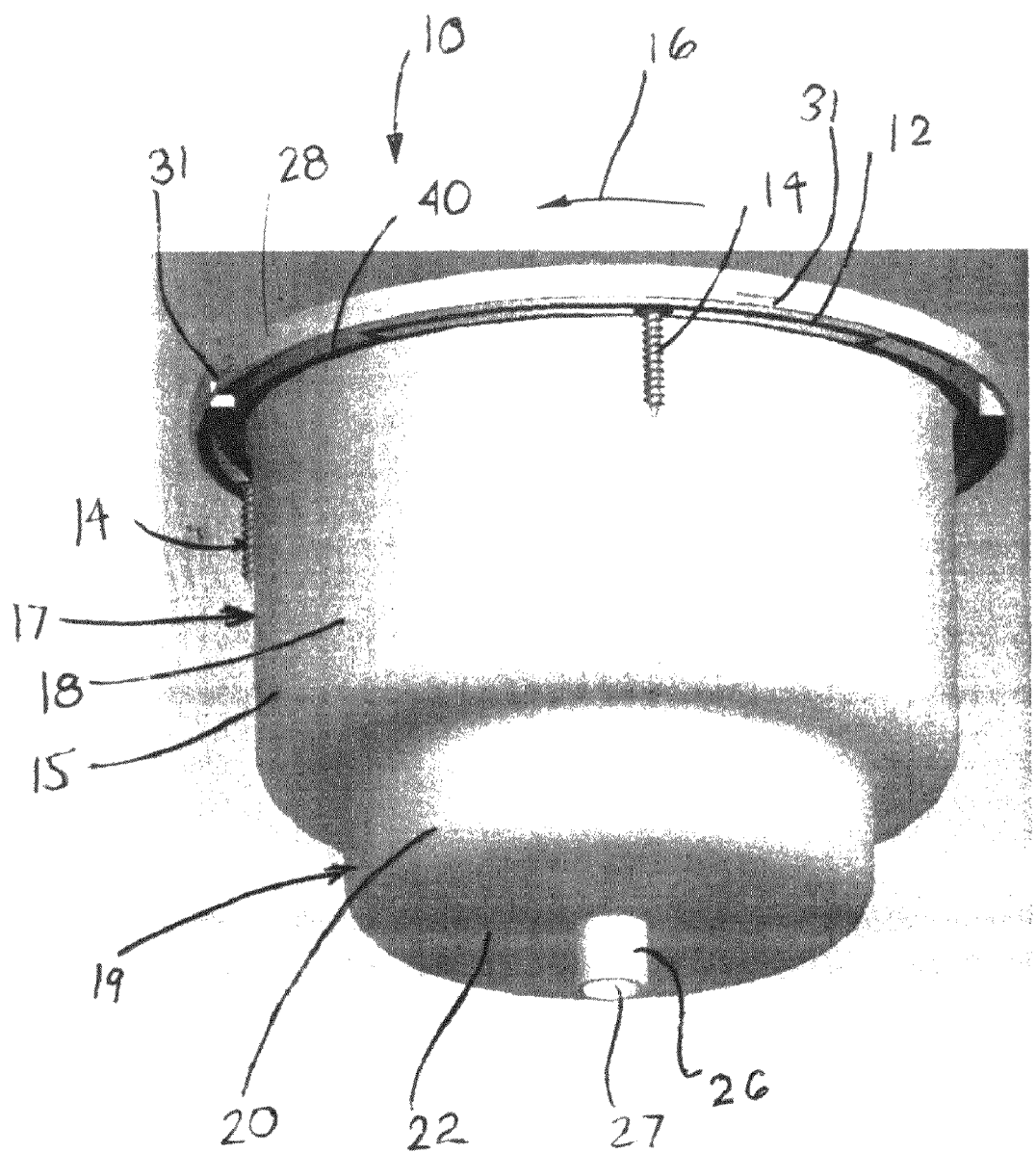
FIG. 1 is a bottom isometric view of the beverage container holder of the invention showing a holder can mounted to a mounting ring.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, the invention relates to a holder 10 for beverage containers which is adapted for mounting to a generally horizontal support surface or platform such as the structure of a vehicle or vessel. The holder 10 particularly is suited for mounting to any desired location as an add-on component to the existing structure of the vehicle or vessel.

The holder 10 is an assembly comprising a mounting ring 12 which is configured for mounting to the support platform by a plurality of screws 14. After affixing the mounting ring 12 in position, a generally cylindrical can or container 15 is provided which fits through the center portion of the mounting ring 12 and is affixed thereto by locking rotation of the can 15 in the direction of reference arrow 16.

Figure 2:
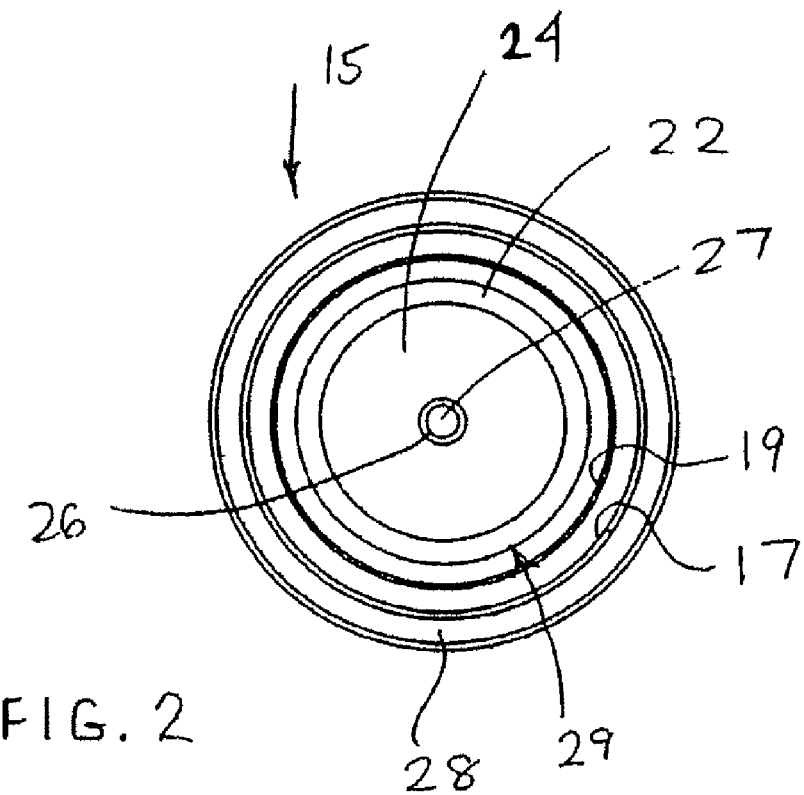
FIG. 2 is a plan view of the can.
Figure 3:
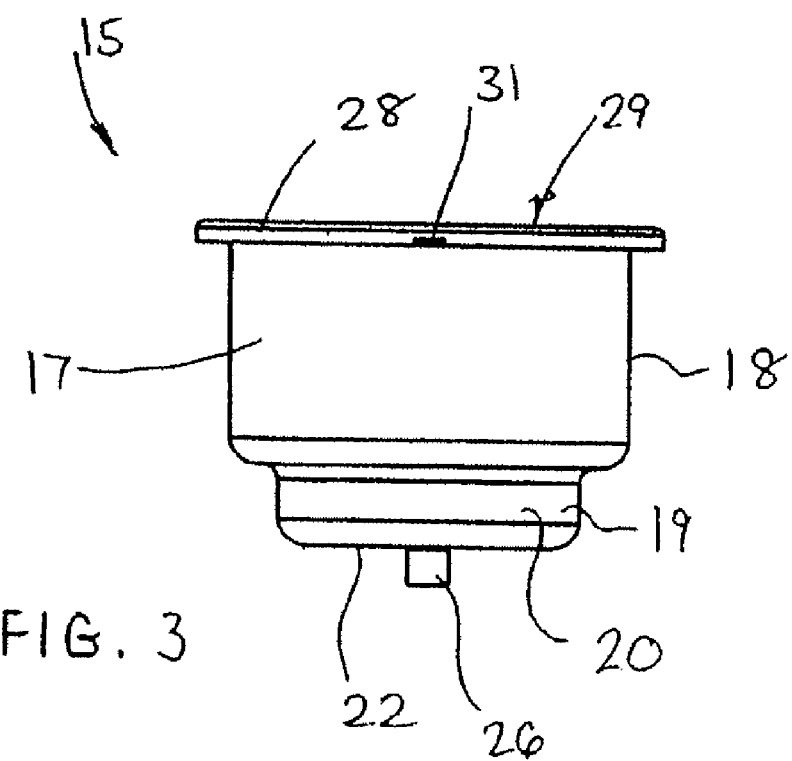
FIG. 3 is a front elevational view of the can.

Referring more particularly to the construction of the can 15 as illustrated in FIGS. 2 and 3, the can 15 comprises a main cylinder body 17 having a main body wall 18 which defines a substantial vertical dimension of the overall height of the can 15. The main cylinder body 17 then transitions downwardly and turns inwardly into a narrower bottom cylinder body 19 which preferably has a reduced diameter as compared to the main cylinder body 17. The bottom cylinder 19 is defined by a bottom cylinder wall 20 and then again transitions radially inwardly to define the bottom can wall 22. The differing diameters of the main cylinder body 17 and bottom cylinder 19 allows for usage of different size beverage containers within the can 15.

The bottom of the can is also provided with a thin elastomer pad 24 (FIG. 2) having a center hole, while the bottom can wall 22 includes a drain nipple 26. Since the holder 10 of the invention is provided for use in marine environments, the nipple 26 serves as a drain for any water from the environment which collects therein. Also, the drain nipple 26 can serve as a spill tube for allowing spillage to also drain to a suitable location. Typically, a drain tube (not illustrated) is attached to the nipple 26 by a suitable elbow.

Next as to the top of the can 15, the main cylinder body 17 transitions upwardly and terminates at a circumferential rim 28 which defines the can opening 29 that allows access to the interior compartment defined within the can 15. Generally, the rim 28 projects radially outwardly from the main body wall 18 and has a plurality of circumferentially spaced apart locking formations 31 which preferably serve as detents for engagement with the mounting ring 12 as will be discussed herein.

Figure 4:
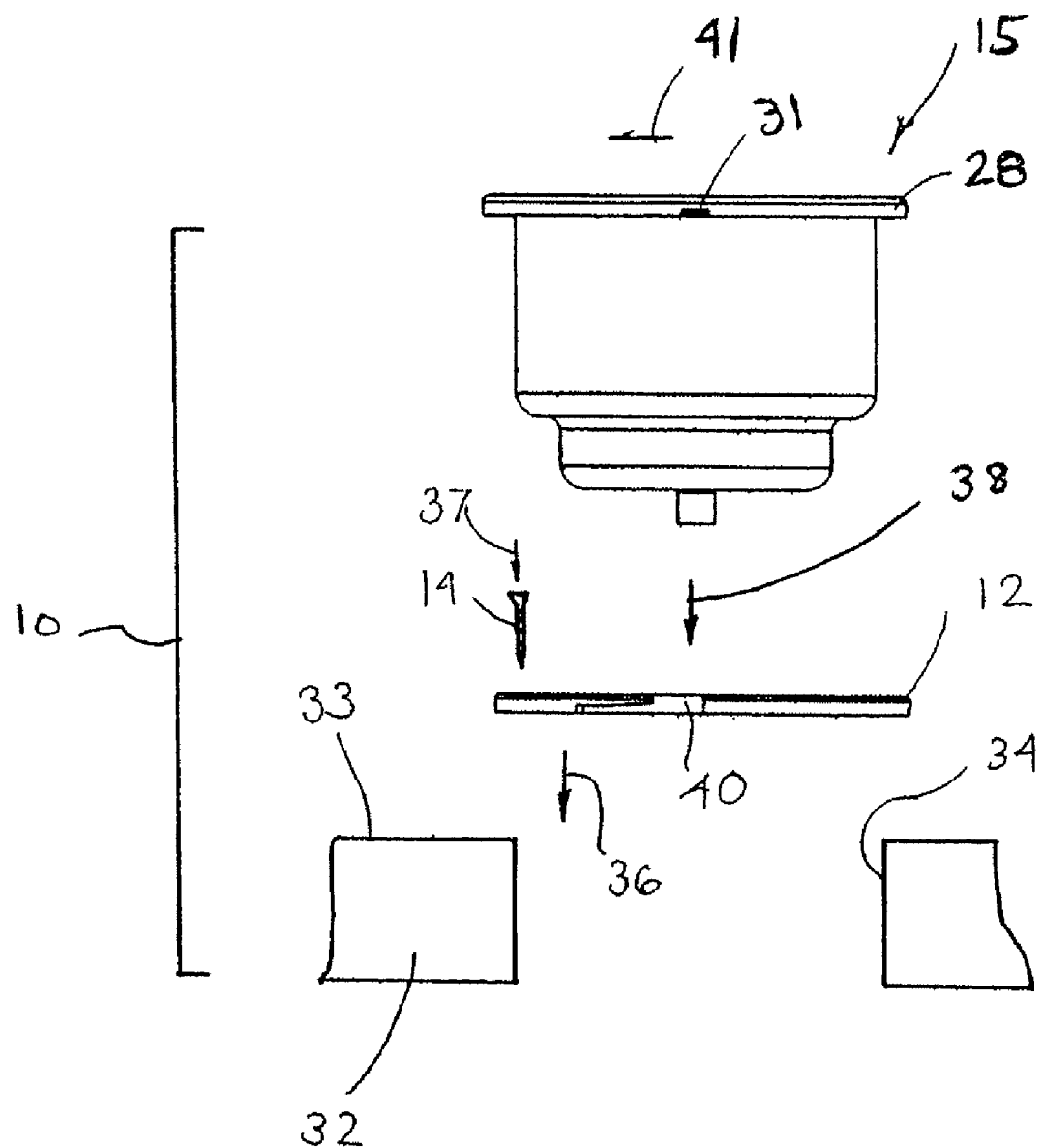
FIG. 4 is an exploded elevational view showing the can and mounting ring being mounted with screw fasteners to a support platform of a vehicle.

Referring more particularly to FIG. 4, the holder 10 is typically mounted to any suitable support platform 32 on the upper surface 33 thereof. Preferably the support platform 32 is formed with a circular bore 34 which opens upwardly for receipt of the holder can 15 therein.

FIG. 4 generally illustrates the assembly of the holder 10 wherein the mounting ring 12 is first positioned over the bore or pocket 34 as indicated by reference arrow 36 and then suitable fasteners such as screws 14 are inserted downwardly therethrough as indicated by reference arrow 37. This positively fixedly secures the mounting ring 12 to the upper surface 33 of the support platform 32 and allows for downward engagement of the can 15 therewith. In particular, the can 15 is aligned with the mounting ring 12 and platform bore 34 in coaxial alignment therewith and then displaced downwardly as indicated by reference arrow 38 so as to insert the can 15 into the bore 34 and ring 12 such that the can rim 28 is seated in overlying engagement with the mounting ring 12. When positioning the can 15, the detents 31 on the can rim 28 are aligned with corresponding locking formations in the mounting ring 12, namely cam slots 40 which allows the can 15 to be fitted downwardly in a fully seated condition on the mounting ring 12. Thereafter, the can 15 is rotated as generally indicated by reference arrow 41 to engage the cooperating locking formations 31 and 40 together and lock the can 15 to the ring 12.

The embodiment can include any type of bayonet connection such that two surfaces are turned in opposite directions to guide a first surface into a second surface slot that prevents the first surface from being removed. The can is held into position to prevent it from backing out. To disconnect the two surfaces the user pushes the two surfaces together to overcome the frictional forces holding the can in its locked position by using a fraction of a turn to reverse the locking turn.

Figure 5:
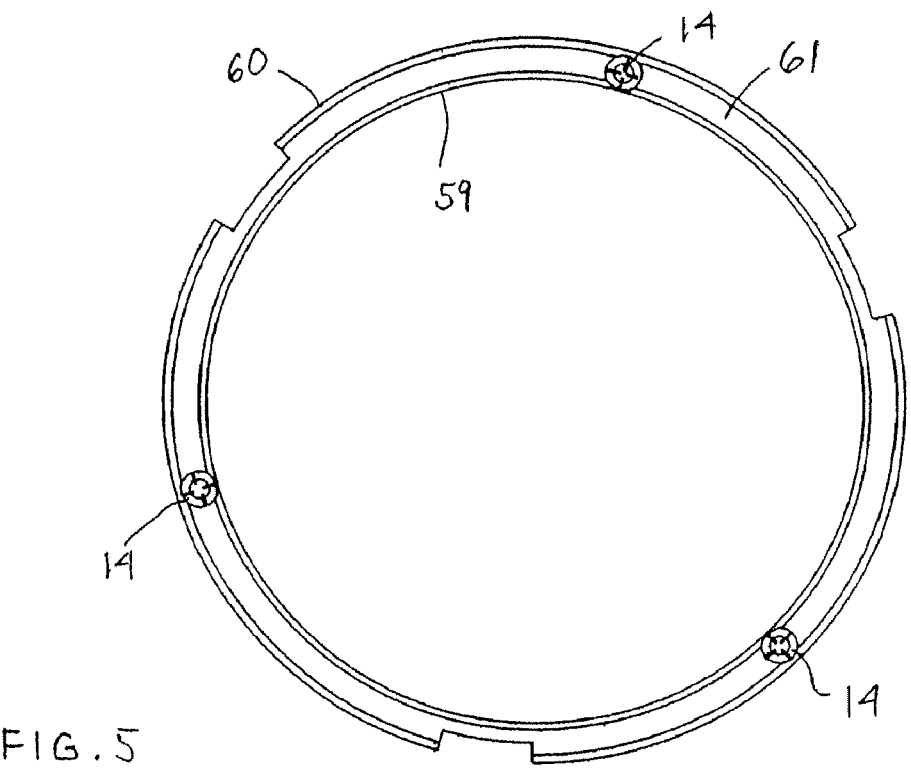
FIG. 5 is a plan view of the mounting ring with screw fasteners.
Figure 6:
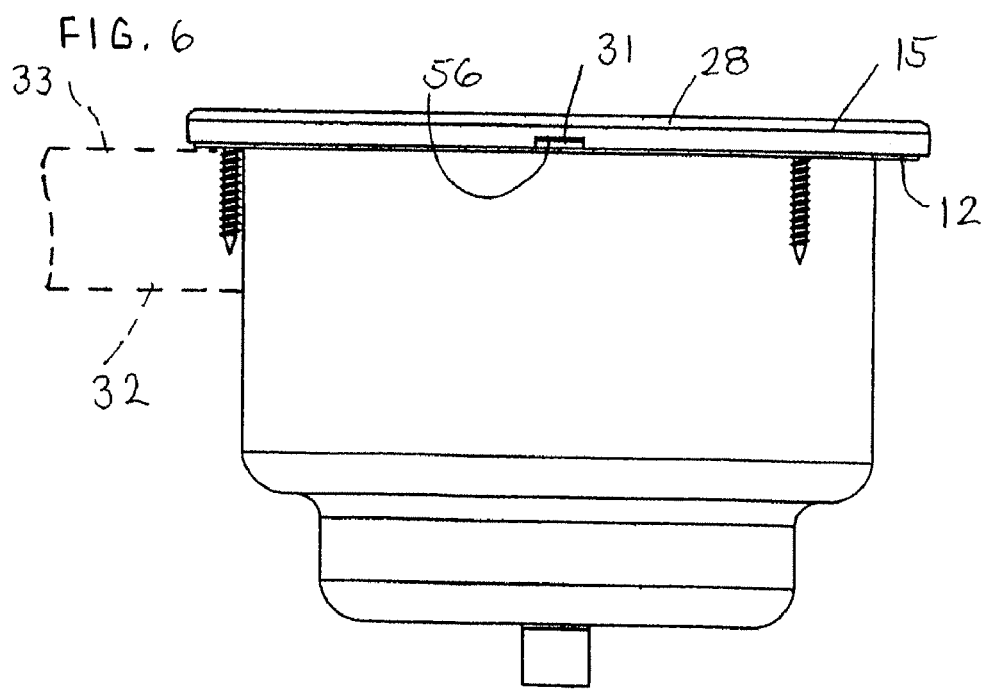
FIG. 6 is an enlarged elevational view of the holder assembly mounted to the vehicle platform using the screw fasteners.

As seen in FIG. 5, the fasteners 14 fit downwardly in circumferentially spaced relation through the mounting ring 12 to secure the mounting ring 12 to the support platform 32 as also generally illustrated in FIG. 6.

When secured in position, the rim 28 substantially encloses the mounting ring 12 as illustrated in FIG. 6 and the can 15 is then mounted so that it only projects slightly above the upper surface 33 of the support platform 32.

Figure 7:
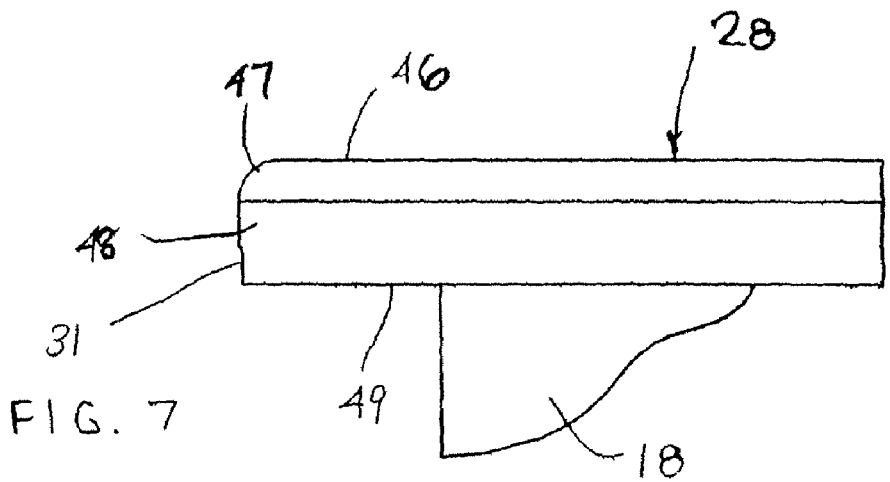
FIG. 7 is a partial enlarged view of the rim of the can.
Figure 8:
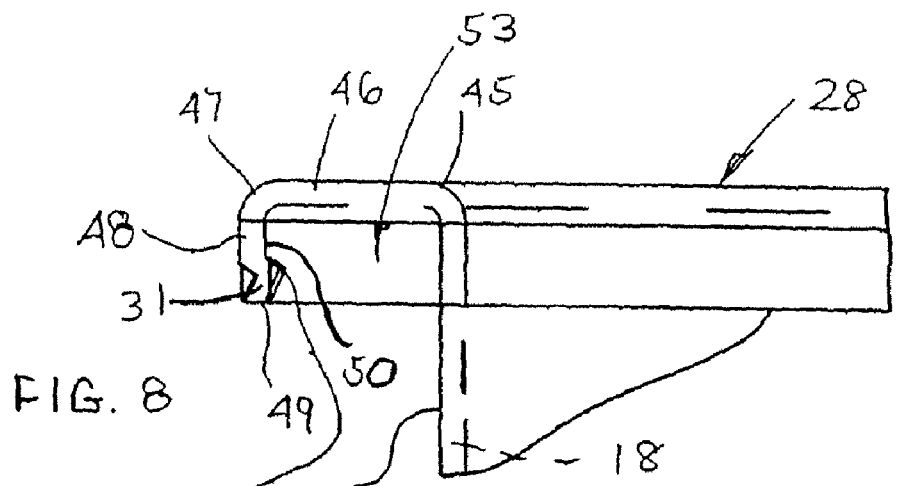
FIG. 8 is an enlarged partial view of the can rim with phantom lines provided therein that illustrate a detent therein.
Figure 9:
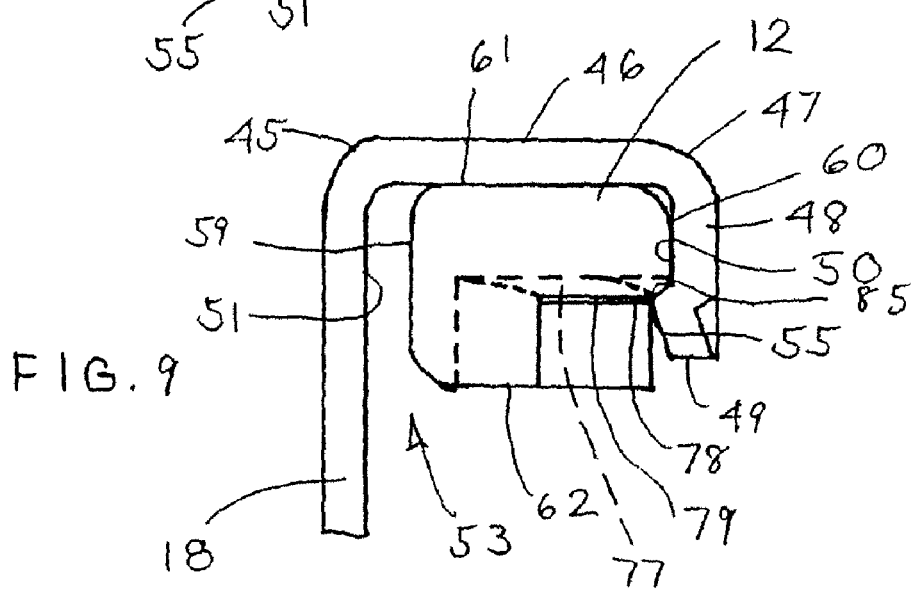
FIG. 9 illustrates the engagement of the detent with the mounting ring.

More particularly as to the arrangement of the locking structure on the can rim 28, FIGS. 7-9 best illustrate this locking structure and namely the detents 31. As seen in FIGS. 7-9, the main body wall 18 extends vertically upwardly to its upper terminal edge 45. At this upper terminal edge 45, the main body wall 18 then is outturned and transitions into the rim 28, and specifically transitions into an upper rim wall 46 which extends radially outwardly. The upper rim wall 46 then turns an additional corner 47 so as to define a downwardly projecting outer rim wall 48 which terminates at a bottom edge 49. This outer rim wall 48 has an inside surface 50 which faces radially towards the opposing outside surface 51 of the main body wall 18 to thereby define an annular ring-receiving channel 53 which is adapted to fit over the mounting ring 12 as can be seen in FIG. 9. This channel 53 opens downwardly and has a width generally corresponding to the overall width of the can rim 28.

To secure the can 15 to the mounting ring 12, a plurality of the locking formations 31 are provided and preferably three such formations are provided at equal angular spacing about the circumference of the outer rim wall 48. Preferably the locking formations 31 are formed as inwardly projecting detents 55 which project a small radial distance into the ring channel 53 and also only have a small angular dimension as illustrated in FIGS. 6 and 15 wherein these detents 55 are defined by opposite angularly-spaced end surfaces 56 and 57.

Preferably, the can 15 is formed as a single unitary body of a suitable corrosion-resistant material including stainless steel, plastics or other resins that are adapted to emit or transmit light.

Turning next to the mounting ring 12, the mounting ring 12 is illustrated in FIGS. 5 and 10-12. This mounting ring 12 has an annular shape defined by inner and outer circumferential surfaces 59 and 60, and top and bottom surfaces 61 and 62. Preferably, the mounting ring 12 is formed from a molded plastic material.

Figure 15:
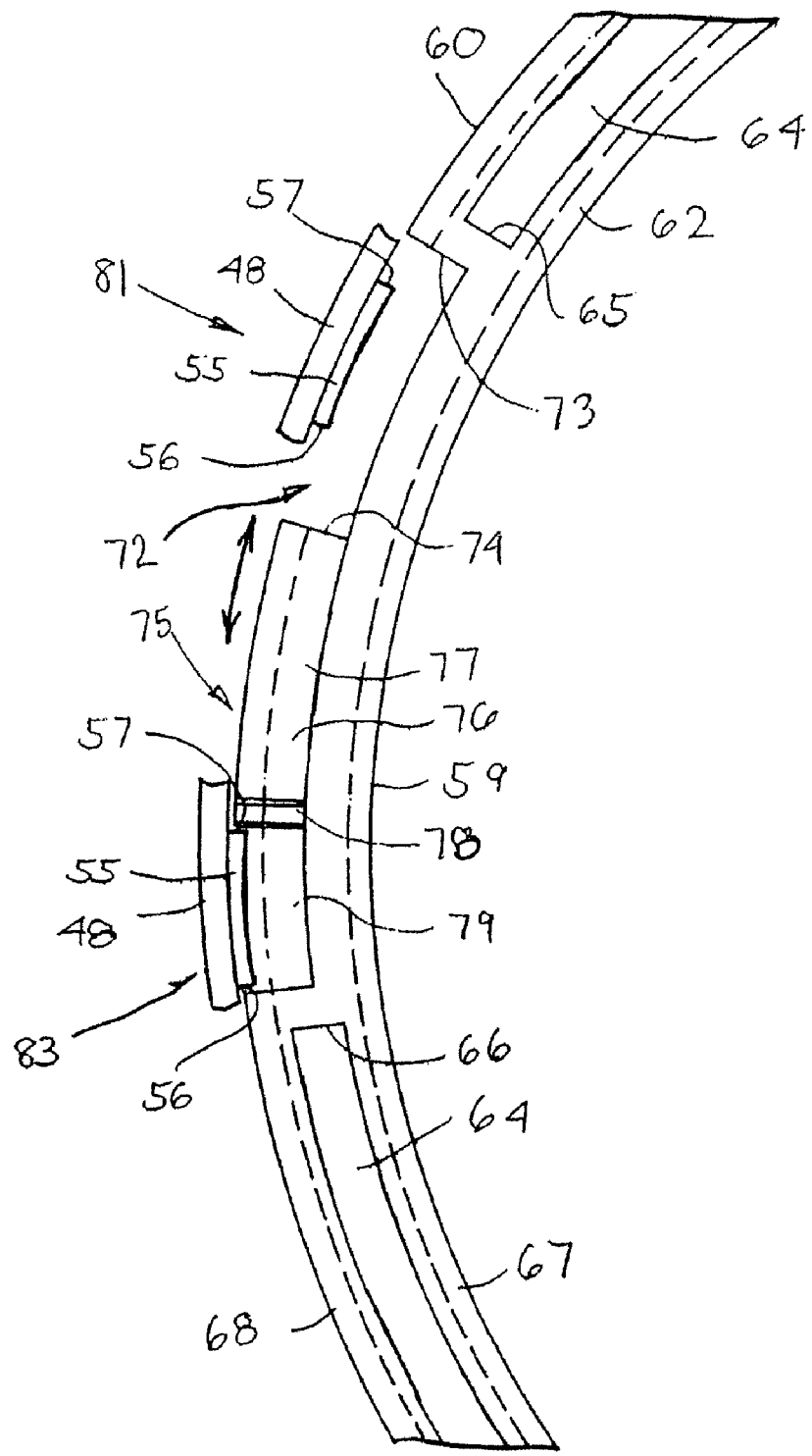
FIG. 15 is a partial plan view of a locking track illustrating a detent being moved between locked and unlocked positions.

Referring to FIGS. 10 and 15, arcuate lengths of the ring 12 are formed with recessed channels 64 which extend between opposite ends 65 and 66 and are defined on opposite sides by channel walls 67 and 68 (FIG. 15). These channels 64 preferably reduce the material used for the mounting ring 12 during molding thereof.

Along the length of the arcuate channels 64, bosses 70 are provided through which the fastener 14, are threadedly engaged with the support platform 32. Preferably as seen in FIG. 10, the bosses 70 are positioned closest to the cam slots 40 to best hold the cam slots 40 in position against the upper support surface 33 during locking rotation of the can 15.

As to the cam slots 40, these cam slots 40 are positioned at equal angular distances from each other as generally illustrated in FIGS. 10-12 and as such are aligned with the detents 55 of the can 15 as diagrammatically illustrated in FIGS. 10 and 12.

As to the specific structure of these cam slots 40, FIGS. 13-15 best illustrate the cam slots 40.

Generally, each cam slot 40 includes a vertical entry passage 72 which opens vertically through the entire thickness of the mounting ring 12 and has a circumferential distance defined by the full thickness passage side face 73 and the partial thickness passage side face 74. The bottom end of the entry passage 72 then opens circumferentially into a cam section 75 which is open on the bottom side thereof but is defined by the top cam face 76. The cam face 76 generally slopes along a first sloped section 77 until it reaches an inclined rib 78. Circumferentially past the rib 78, a flat lock seat 79 is formed. It is noted that the dimension of the lock seat 79 is shallower than the first sloped section 77 which progressively varies along the length thereof.

During mounting of the can 15 to the mounting ring 12, the detents 55 are first aligned with the entry passage 72 as generally illustrated in FIG. 15 which shows the detent 55 in a first unlocked position indicated by reference arrow 81. This unlocked position 81 also is diagrammatically illustrated in FIGS. 10 and 12. Once the can 15 is fully seated with the mounting ring 12 being completely seated within the ring channel 53 of the can rim 28 shown in FIG. 9, the can 15 can then be rotated as indicated by reference arrow 82 in FIG. 10. This causes the detents 55 to rotate or translate circumferentially to the fully locked position 83 shown in FIGS. 12 and 15. In particular the detents 55 then ride over the cam rib 78 of the cam slot 40 and then seat within the lock seat 79 thereof. In particular, the inwardly projecting detent 55 generally rides along the outer edge portion of the cam slot 40 along the outer cam edge 85. FIG. 9 illustrates the detent 55 generally in contact with the cam rib 78 as it rides thereover and prepares to either move into the lock seat 79 or back to the slope section 77 depicted in FIG. 9 in phantom outline. This riding of the detent 55 along the slope cam section 77 draws the can rim 28 downwardly into tight-fitting engagement with the mounting ring 12. As the detent 55 rides over the cam rib 78, a positive resistance to locking is felt and then this resistance drops off slightly as the detent 55 then aligns with the lock seat 79 in the locked position 83 (FIG. 15). The detent end face 57 then faces towards and is positioned for contact with the rib 78 so as to resist return rotation of the cam 15. Therefore, this slope section 77 causes a positive drawing of the can 15 downwardly towards the support platform 32 while the rib 78 then causes the detent 55 to move over into a positively locked position 83.

During assembly, the mounting ring 12 is first positioned and fastened to the support surface 32 by the fasteners 14. Thereafter, the can 15 is positioned with the detents 55 thereof in alignment with the corresponding entry passages 72 of the cam slots 40. As the can 15 is moved downwardly to the fully seated position with the mounting ring 12 seated fully within the ring channel 53 (FIG. 9), the can 15 is then rotated as generally depicted in FIGS. 10 and 15 to the positively locked position 83. In this manner, an improved mounting arrangement is provided for positively locking the beverage containing can 15 in position on a desired vehicle or vessel.

Figure 16:
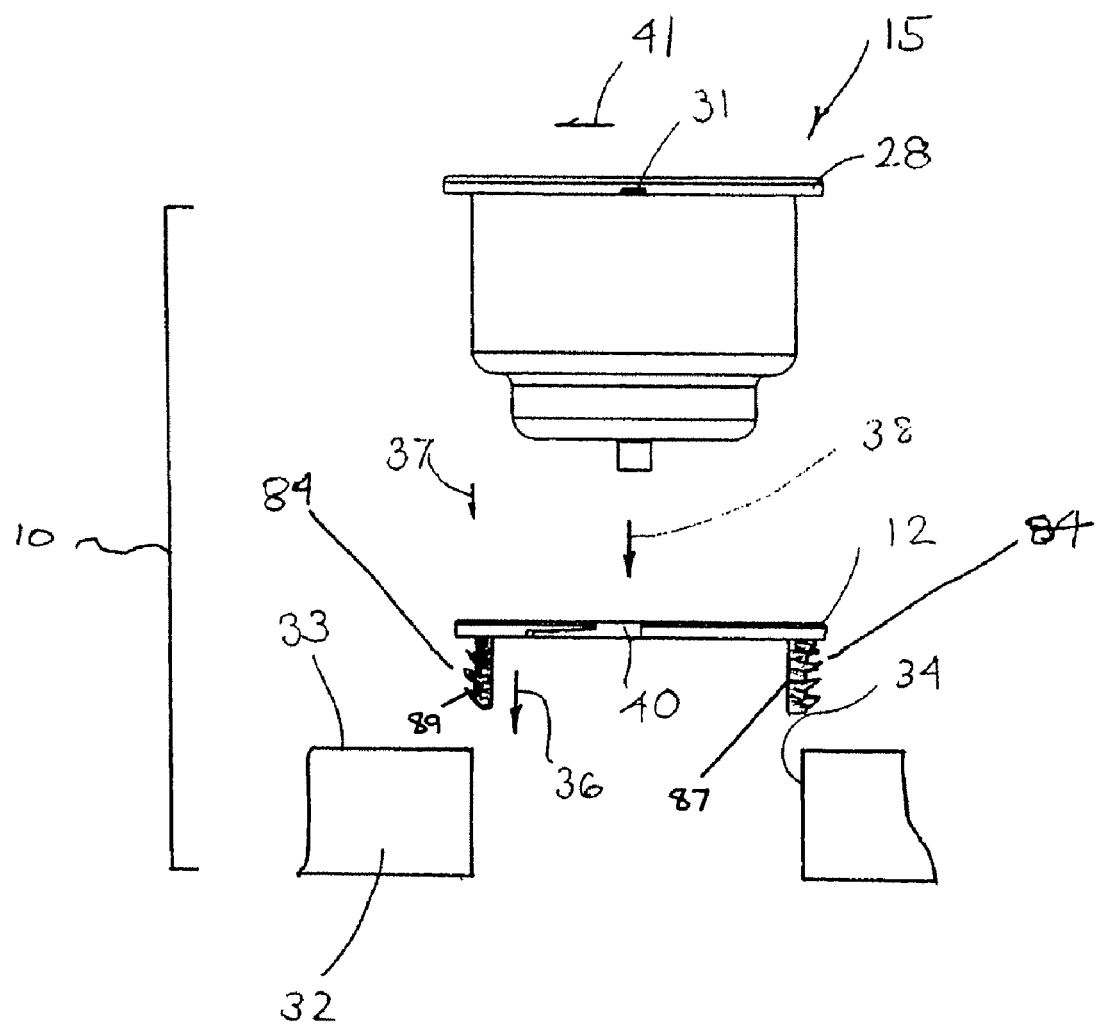
FIG. 16 is an exploded elevational view showing the can and mounting ring being mounted with flexible finger fasteners to a support platform of a vehicle.
Figure 17:
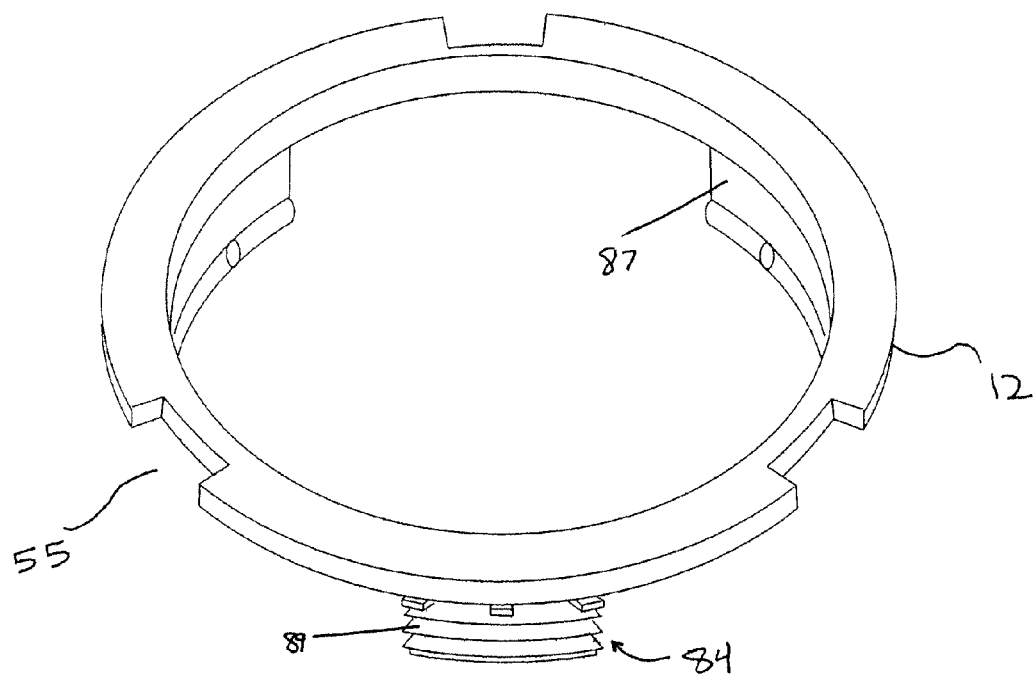
FIG. 17 is a plan view of the mounting ring with flexible finger fasteners.

Another embodiment of the present invention includes, as seen in FIGS. 16 and 17, an assembly comprising a mounting ring 12 which is configured for mounting to the support platform by circumferentially spaced fasteners 84 which frictionally engage the support platform 32. After affixing the mounting ring 12 in position, a generally cylindrical can or container 15 is provided which fits through the center portion of the mounting ring 12 and is affixed thereto by locking rotation of the can 15 in the direction of reference arrow 16. The mounting ring 12 with the fasteners 84 on the mounting ring 12 fit downwardly in circumferentially spaced relation through the bore 34 to secure the mounting ring 12 to the support platform 32 as also generally illustrated in FIG. 18. The fasteners 84 comprise flexible fingers 87 that extend downwardly and include detents 89 that extend outwardly to frictionally engage the support platform 32 in the bore 34 also see FIG. 17.

FIG. 16 generally illustrates the assembly of the holder 10 wherein the mounting ring 12 is first positioned over the bore 34 as indicated by reference arrow 36 and then suitable fasteners 84 comprising circumferentially spaced and downwardly extending flexible fingers 87 with outwardly radiating detents 89 are inserted downwardly therethrough as indicated by reference arrow 37. Alternative fasteners could also be used, these include but are not limited to; any friction type fastener of smooth, ridged, continuous or discontinuous design; adhesive fasteners where an adhesive coating of any type may be applied to either the support platform 32 or the mounting ring 12 or both with optional flexible coverings placed on the adhesive until it is to be fixed; screw type fasteners where metal or plastic screws of any shape are used; or any other type of fastener know to one skilled in the art that can be used to secure the mounting ring to the support platform.

The fasteners 84 positively fixedly secure the mounting ring 12 to the upper surface 33 of the support platform 32 and allows for downward engagement of the can 15 therewith. In particular, the can 15 is aligned with the mounting ring 12 and platform bore 34 in coaxial alignment therewith and then displaced downwardly as indicated by reference arrow 38 so as to insert the can 15 into the bore 34 and ring 12 such that the can rim 28 is seated in overlying engagement with the mounting ring 12. When positioning the can 15, the detents 31 on the can rim 28 are aligned with corresponding locking formations in the mounting ring 12, namely cam slots 40 which allows the can 15 to be fitted downwardly in a fully seated condition on the mounting ring 12. Thereafter, the can 15 is rotated as generally indicated by reference arrow 41 to engage the cooperating locking formations 31 and 40 together and lock the can 15 to the ring 12.

Figure 18:
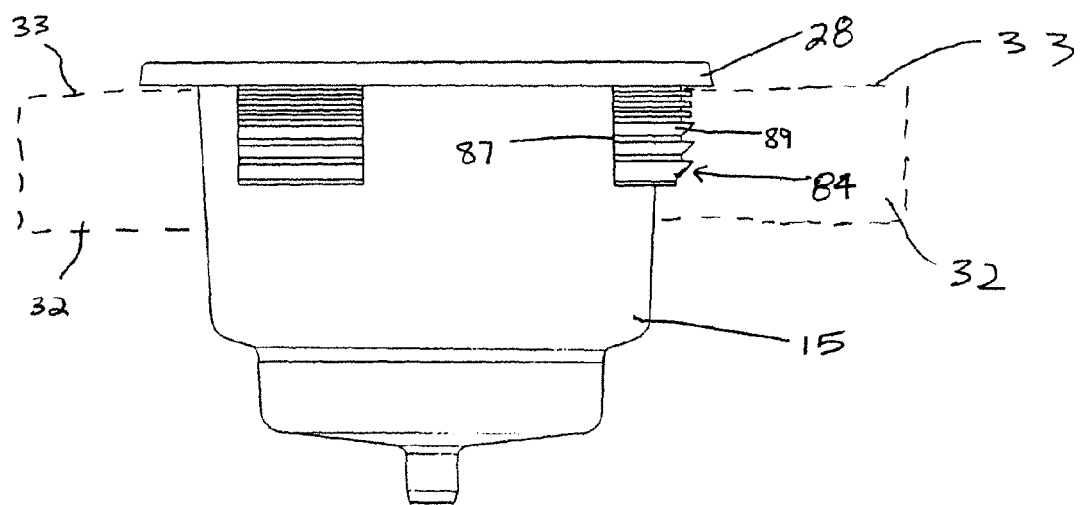
FIG. 18 is an enlarged elevational view of the holder assembly mounted to the vehicle platform using the flexible finger fasteners.
Figure 19:
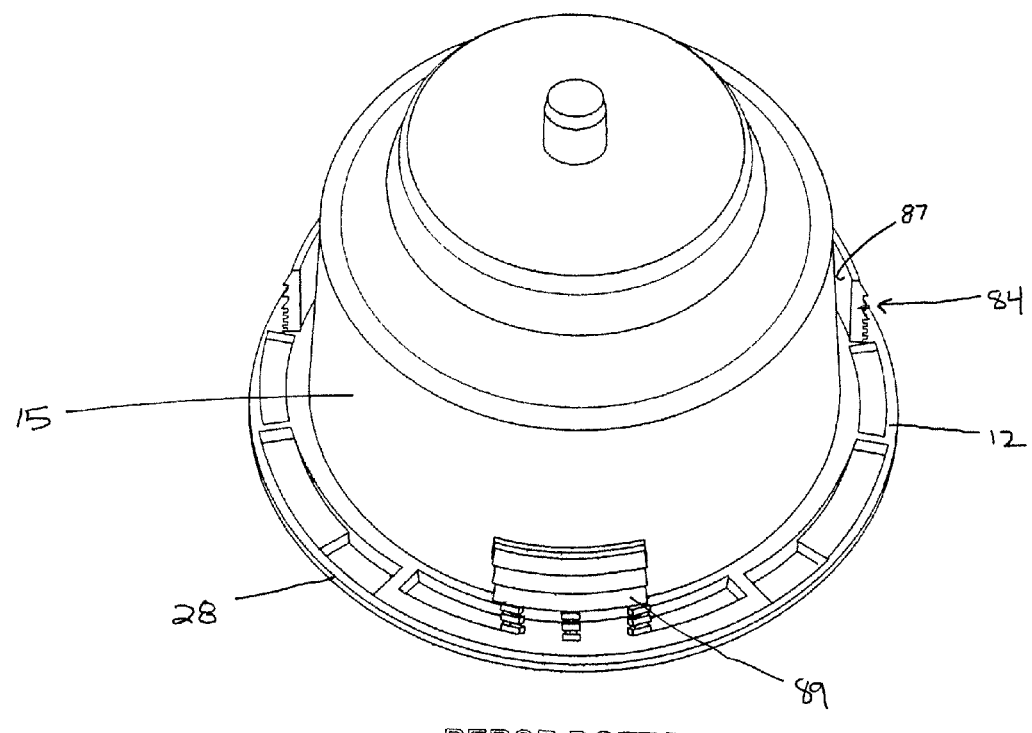
FIG. 19 is a bottom view of the holder assembly using the flexible finger fasteners.
Figure 20:
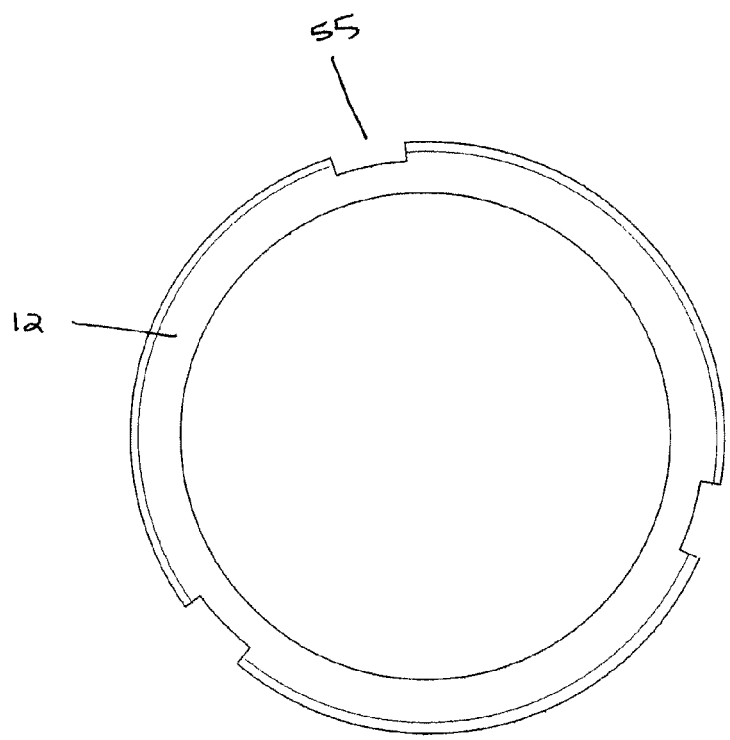
FIG. 20 is a top view of the mounting ring with circumferentially spaced flexible finger fasteners and detents.

As seen in FIG. 18, the fasteners 84 comprise of downwardly extending fingers 87 with outwardly radiating detents 89 that frictionally engage the support platform 32 to affix the mounting ring 12 in the support platform 32. Preferably, there are a plurality of detents 89 to provide increased frictional engagement to the support platform 32. It is also contemplated in this embodiment that a single detent 89 can be used to frictionally engage the mounting 12. The detents 89 can be made of various shapes and sizes. For instance, the detents 89 can have a triangular shaped cross-section, in which a point of the triangularly shaped detent frictionally engages the support platform 32 to help prevent upward removal of the mounting ring 12 from the support platform 32. In some embodiments, the detents 89 are formed as a plurality of ridges on the downward fingers 87 in which the detents 89 span the axial width of the finger 87 or are limited to a small width of the finger 87. In other embodiments, the detents 89 are formed as a plurality of conical protrusions on each finger 87.

Figure 21:
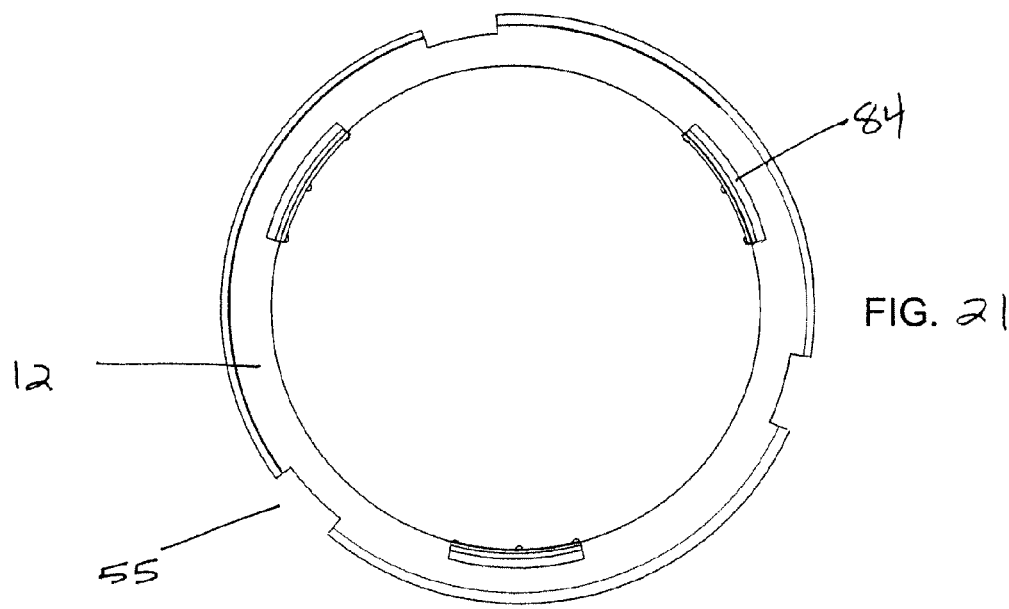
FIG. 21 is a bottom view of the mounting ring with circumferentially spaced flexible finger fasteners and detents.

As seen in FIG. 21, for example, the mounting ring 12 includes three circumferentially spaced fasteners 84 but other embodiments, depending on the support platform 32 material and construction, could include more or less fasteners 84 to provide the optimal frictional engagement at the lowest manufacturing cost In some embodiments for increased engagement and affixing to the support platform 32, the fastener 84 can be adapted as one continuous support ring extending downwardly from the mounting ring 12 with a plurality of detents 89 that spans the entire circumference of the mounting ring 12 thereby providing circumferential affixing of the mounting ring 12 to the support platform 32.

Further embodiment modifications include using materials for the holder 10, cylindrical can 15, the rim of the can 28, or the mounting ring 12 which can be manufactured with either phosphorescent materials, fluorescent materials, or other substances that radiate visible light after being energized to provide increased visibility in low light conditions.

Further embodiment modifications include using materials for the holder 10, cylindrical can 15, the rim of the can 28, or the mounting ring 12 which can be manufactured with either translucent or transparent materials that capture and transmit light from generating sources, such as a light positioned below or next to the beverage container holder 10 to provide back illumination for enhanced visibility in the dark.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A beverage container holder for a support platform, said holder comprising:
a container having a side wall which defines an upward opening hollow interior adapted to receive a beverage container downwardly therein, said side wall having a peripheral mounting flange which projects radially outwardly and extends about a periphery of said side wall, said mounting flange being defined by an exposed exterior flange surface which faces outwardly and an interior flange surface which faces inwardly toward the support platform; and
an annular mounting ring which is shaped to extend about a holder-receiving opening in the support platform and is mountable on an upper surface of the support platform, said mounting ring including fasteners which fixedly secure said mounting ring in a fixed position on the support platform, said mounting ring including a ring surface which faces toward said interior flange surface in opposed relation and said mounting flange and said mounting ring including cooperating fastening parts which are engageable with each other between said opposed interior flange surface and ring surface so as to be substantially hidden, wherein said container is secured to the support platform by its engagement with said mounting ring.

2. The beverage container holder according to claim 1, wherein said cooperating fastening parts comprise a bayonet type connection effected by relative movement of said container and said mounting ring.

3. The beverage container holder according to claim 2, wherein said bayonet type connection has a detent which locks into said mounting ring by relative movement of said container and said mounting ring.

4. The beverage container holder according to claim 3, wherein said engagement is effected by rotation of said container relative to said mounting ring.

5. The beverage container holder according to claim 4, wherein said mounting flange comprises a sidewardly extending top flange wall and a downwardly depending side flange wall, said mounting flange including a side ring surface disposed in sideward-facing, opposing relation with said side flange wall, said cooperating fastening parts being disposed on said side ring surface and said side flange wall.

6. The beverage container holder according to claim 1, wherein said cooperating fastening parts comprise a slot and a detent which are provided respectively on said mounting ring and said mounting flange with said detent being lockingly insertable within said slot.

7. The beverage container holder according to claim 6, wherein said mounting flange comprises a sidewardly extending top flange wall and a downwardly depending side flange wall, said mounting flange including a side ring surface disposed in sideward-facing, opposing relation with said side flange wall, said slot being disposed on said side ring surface and said detent being disposed on said side flange wall.

8. The beverage container holder according to claim 7, wherein said detent is insertable downwardly into said slot and then movable peripherally along said slot to a locked position upon rotation of said container relative to said mounting ring.

9. The beverage container holder according to claim 1, wherein said mounting flange defines a downward opening flange channel into which said mounting ring is received so as to enclose said fasteners and prevent viewing thereof when said container is engaged with said mounting ring.

10. The beverage container holder according to claim 1, wherein said container, said side wall, mounting flange, can rim, or mounting ring are comprised of phosphorescent or fluorescent materials.

11. The beverage container holder according to claim 1, wherein said container, said side wall, mounting flange, can rim, or mounting ring are comprised of translucent or transparent materials that allow for the transmission of light.

12. A beverage container holder for a support platform, said holder comprising:
a container having a side wall which defines an upward opening hollow interior adapted to receive a beverage container downwardly therein, said side wall having a peripheral mounting flange which projects radially outwardly and extends about a periphery of said side wall, said mounting flange being defined by an exposed exterior flange surface which faces outwardly and an interior flange surface which faces inwardly toward the support platform said interior flange surface of said mounting flange defining a downward opening flange channel; and
an annular mounting ring which is shaped to extend about a holder-receiving opening in the support platform and is mountable on an upper surface of the support platform, said mounting ring including fasteners which fixedly secure said mounting ring in a fixed position on the support platform, said mounting ring including a ring surface which faces toward said interior flange surface in opposed relation wherein said mounting ring is enclosed within said flange channel when said container is positioned thereon and said fasteners are hidden from view in said flange channel, said mounting flange and said mounting ring further including cooperating fastening parts which are engageable with each other between said opposed interior flange surface and ring surface by relative movement of said container and said mounting ring, said cooperating fastening parts being substantially hidden, wherein said container is secured to the support platform by its engagement with said mounting ring.

13. The beverage container holder according to claim 12, wherein said cooperating fastening parts comprise a bayonet type connection effected by relative movement of said container and said mounting ring which is affected by rotation of said container relative to said mounting ring.

14. The beverage container holder according to claim 13, wherein said bayonet type connection has a detent which locks into said mounting ring by relative movement of said container and said mounting ring.

15. The beverage container holder according to claim 14, wherein said mounting flange comprises a sidewardly extending top flange wall and a downwardly depending side flange wall which define said flange channel, said mounting flange including a side ring surface disposed in sideward-facing, opposing relation with said side flange wall, and said cooperating fastening parts being disposed on said side ring surface and said side flange wall.

16. The beverage container holder according to claim 15, wherein said cooperating fastening parts comprise a slot and a detent which are provided respectively on said mounting ring and said mounting flange with said detent being lockingly insertable within said slot.

17. The beverage container holder according to claim 16, wherein said mounting flange comprises a sidewardly extending top flange wall and a downwardly depending side flange wall, said mounting flange including a side ring surface disposed in sideward-facing, opposing relation with said side flange wall, said slot being disposed on said side ring surface and said detent being disposed on said side flange wall.

18. The beverage container holder according to claim 17, wherein said detent is insertable downwardly into said slot and then movable peripherally along said slot to a locked position upon rotation of said container relative to said mounting ring.

19. The beverage container holder according to claim 12, wherein said container, said side wall, mounting flange, can rim, or mounting ring are comprised of phosphorescent or fluorescent materials.

20. The beverage container holder according to claim 12, wherein said container, said side wall, mounting flange, can rim, or mounting ring are comprised of translucent or transparent materials that allow for transmission of light.

21. A beverage container holder for a support platform, said holder comprising:
a container having a side wall which defines an upward opening hollow interior adapted to receive a beverage container downwardly therein, said side wall having a peripheral mounting flange which projects radially outwardly and extends about a periphery of said side wall, said mounting flange being defined by an exposed exterior flange surface which faces outwardly and an interior flange surface which faces inwardly toward the support platform; and
an annular mounting ring which is shaped to extend about a holder-receiving opening in the support platform and is mountable on an upper surface of the support platform, said mounting ring including fasteners which fixedly secure said mounting ring in a fixed position on the support platform, said mounting ring including a ring surface which faces toward said interior flange surface in opposed relation and said mounting flange and said mounting ring including cooperating fastening parts which are engageable with each other between said opposed interior flange surface and ring surface by rotation of said container relative to said mounting ring, said cooperating fastening parts and said fasteners being substantially hidden by said mounting flange, wherein said container is secured to the support platform by its engagement with said mounting ring.

22. The beverage container holder according to claim 21, wherein said cooperating fastening parts comprise a slot and a projection which are provided respectively on said mounting ring and said mounting flange with said projection being lockingly insertable within said slot.

23. The beverage container holder according to claim 22, wherein said slot opens sidewardly and said projection projects sidewardly into said slot from said mounting flange.

24. The beverage container holder according to claim 23, wherein said projection is insertable downwardly into said slot and then movable peripherally along said slot to a locked position upon rotation of said container relative to said mounting ring.

25. The beverage container holder according to claim 21, wherein said mounting flange comprises a sidewardly extending top flange wall and a downwardly depending side flange wall, said mounting flange including a side ring surface disposed in sideward-facing, opposing relation with said side flange wall, said cooperating fastening parts comprising a slot disposed on one of said side ring surface and said side flange wall and a projection being disposed the other of said side ring surface and said side flange wall.

26. The beverage container holder according to claim 25, wherein plurality of said projections and a plurality of said slots are provided.

27. The beverage container holder according to claim 21, wherein said container, said side wall, mounting flange, can rim, or mounting ring are comprised of phosphorescent or fluorescent materials.

28. The beverage container holder according to claim 21, wherein said container, said side wall, mounting flange, can rim, or mounting ring are comprised of translucent or transparent materials that allow the transmission of light.

29. A beverage container holder for a support platform, said holder comprising:
a container having a side wall which defines an upward opening hollow interior adapted to receive a beverage container downwardly therein, said side wall having a peripheral mounting flange which projects radially outwardly and extends about a periphery of said side wall, said mounting flange being defined by an exposed exterior flange surface which faces outwardly and an interior flange surface which faces inwardly toward the support platform; and
an annular mounting ring which is shaped to extend about a holder-receiving opening in the support platform and is mountable on an upper surface of the support platform, said mounting ring comprises;
a fastener which fixedly secures said mounting ring in a fixed position on the support platform, and
a ring surface which faces toward said interior flange surface in opposed relation and said mounting flange, and
cooperating fastening parts which are engageable with each other between said opposed interior flange surface and ring surface so as to be substantially hidden, wherein said container is secured to the support platform by its engagement with said mounting ring.

30. A beverage container holder according to claim 29, wherein said fastener comprises a plurality of circumferentially spaced fingers about the mounting ring with detents that radiate outwardly and frictionally engage the support platform to affix the mounting ring.

31. A beverage container holder according to claim 29, wherein said fastener comprises a continuous fastening ring that spans the entire circumference of the mounting ring and extends downward with a plurality of detents that radiate outwardly and frictionally engage the support platform to affix the mounting ring.

32. The beverage container holder according to claim 29, wherein said container, said side wall, mounting flange, can rim, or mounting ring are comprised of phosphorescent or fluorescent materials.

33. The beverage container holder according to claim 29, wherein said container, said side wall, mounting flange, can rim, or mounting ring are comprised of translucent or transparent materials that allow the transmission of light.

* * * * *